United States Patent [19]

Mizoguchi

[11] Patent Number: 4,630,475
[45] Date of Patent: Dec. 23, 1986

[54] FIBER OPTIC LEVEL SENSOR FOR HUMIDIFIER
[75] Inventor: Saburo Mizoguchi, Osaka, Japan
[73] Assignee: Sharp Kabushiki Kaisha, Saka, Japan
[21] Appl. No.: 714,161
[22] Filed: Mar. 20, 1985
[51] Int. Cl.⁴ .............................................. G01F 23/02
[52] U.S. Cl. ........................................ 73/293; 261/1; 356/440
[58] Field of Search .................. 73/293, 327; 250/577, 250/96.15

[56] References Cited
U.S. PATENT DOCUMENTS

| | | | |
|---|---|---|---|
| 1,712,656 | 5/1929 | Ford, Jr. .................. | 73/293 |
| 2,620,660 | 12/1952 | Goldsmith .................. | 73/293 |
| 3,044,288 | 7/1962 | Randall et al. .................. | 73/1 G |
| 3,383,917 | 5/1968 | Ryder et al. .................. | 73/327 |
| 3,637,194 | 1/1972 | Swimmer et al. .................. | 261/92 X |
| 3,727,242 | 4/1973 | Miller .................. | 73/327 X |
| 4,106,914 | 8/1978 | Kun-Ming .................. | 73/293 X |
| 4,193,004 | 3/1980 | Lobdell et al. .................. | 73/293 X |
| 4,246,489 | 1/1981 | Yoshida et al. .................. | 250/577 |
| 4,303,601 | 12/1981 | Grimm et al. .................. | 73/293 |
| 4,441,027 | 4/1984 | Richardson et al. .................. | 250/577 |

*Primary Examiner*—Daniel M. Yasich
*Attorney, Agent, or Firm*—Flehr, Hohbach, Test, Albritton & Herbert

[57] ABSTRACT

An apparatus such as a humidifier comprises a water storage tank having an externally exposed surface made of a transparent material and its bottom surface is made partially or totally of a transparent plate. A light source is disposed underneath this transparent plate and there is placed inside the tank a structure having surfaces for reflecting or refracting light from this source to the aforementioned externally exposed surface so that the water level inside the tank is easily visible.

6 Claims, 7 Drawing Figures

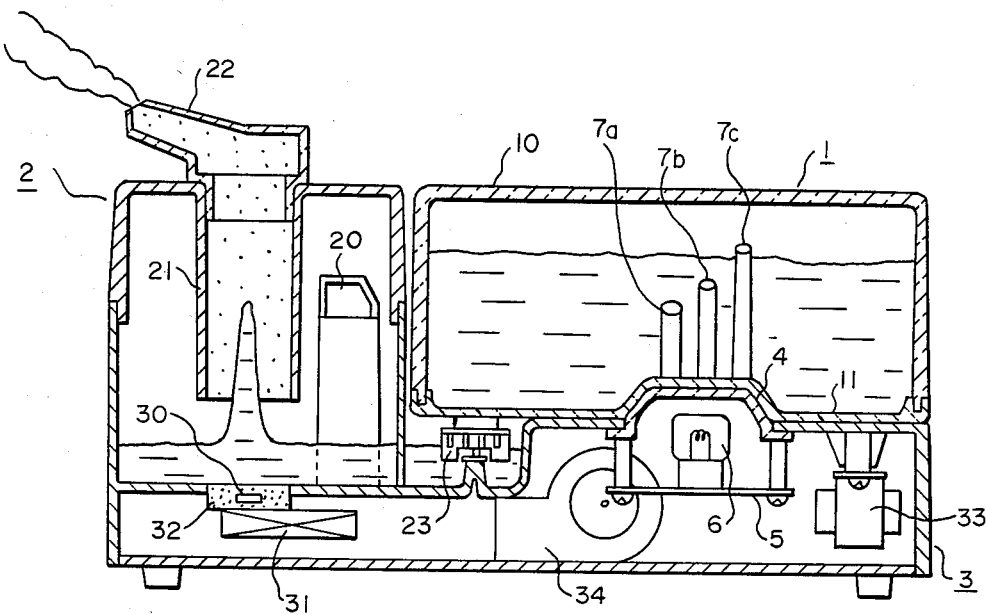
FIG.—1A
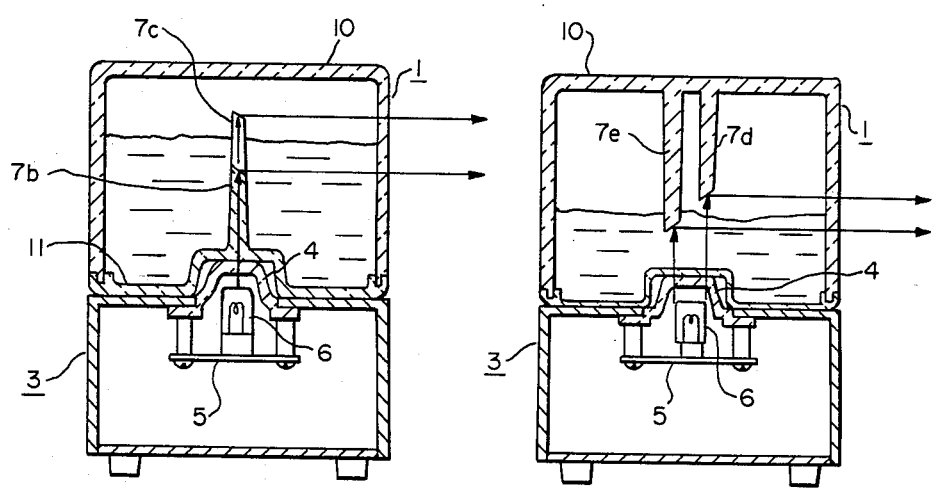
FIG.—1B     FIG.—2

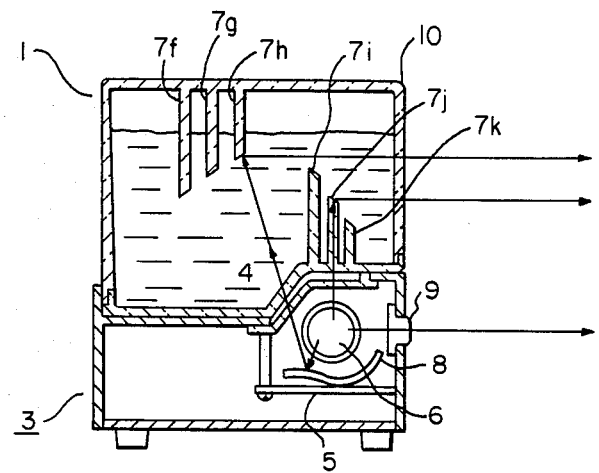
FIG. — 3
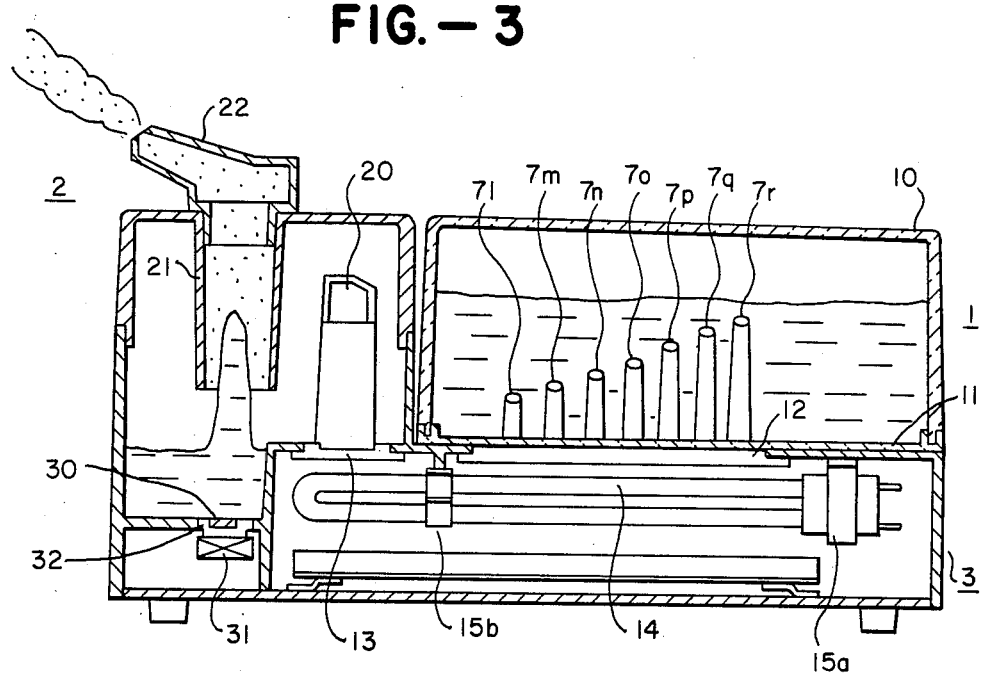
FIG. — 4

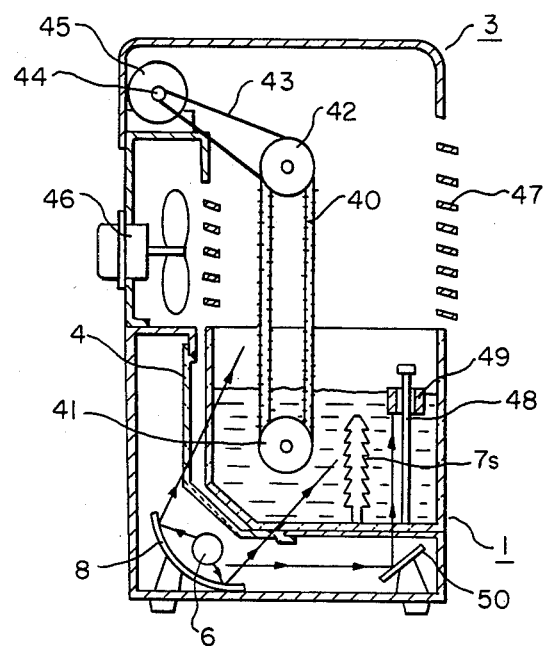
FIG. — 5
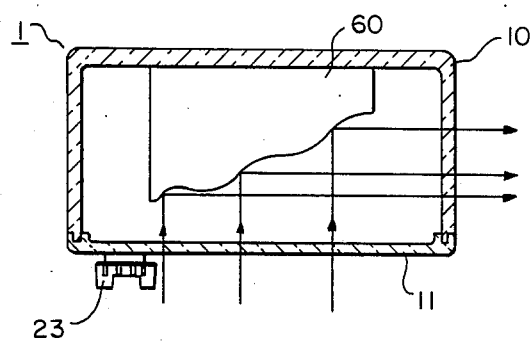
FIG. — 6

FIBER OPTIC LEVEL SENSOR FOR HUMIDIFIER

This invention relates to a humidifier for humidifying a room by storing water in a tank and atomizing this stored water.

Humidifiers of this type generally have at least an externally exposed portion of the tank made of a transparent plate so that the user can check the water level inside and add some water if the level is too low. The boundary between water and air, however, is not always easy to determine visually. It is particularly difficult when the humidifier is in a dark room.

It is therefore an object of this invention to eliminate the aforementioned difficulty by providing a humidifier of which the water level in the tank can be ascertained easily by using light.

It is another object of this invention to provide an apparatus for displaying by using light the liquid level in a tank which contains a light-transmissive liquid.

The above and other objects of the present invention are achieved by providing a humidifier with a water tank of which the bottom is either partially or totally made of a transparent plate. A light source is disposed below this transparent plate and there is also disposed inside the tank a structure having surfaces such that the light from this source will be reflected or refracted by these surfaces to a transparent side wall of the tank which is exposed externally.

The foregoing objects and invention will be more clearly understood from the following description in which the drawings are illustrative thereof.

FIG. 1(A) is a front cross-sectional view of a humidifier embodying the present invention.

FIG. 1(B) is a side cross-sectional view of the humidifier of FIG. 1(A).

FIG. 2 is a side cross-sectional view of a humidifier according to a second embodiment of the present invention.

FIG. 3 is a side cross-sectional view of a humidifier according to a third embodiment of the present invention.

FIG. 4 is a front cross-sectional view of a humidifier according to a fourth embodiment of the present invention.

FIG. 5 is a side cross-sectional view of a humidifier according to a fifth embodiment of the present invention.

FIG. 6 is a cross-sectional view of a part of a humidifier according to a sixth embodiment of the present invention.

FIGS. 1(A) and 1(B) show a humidifier embodying the present invention which comprises a water storage tank 1, an atomization chamber 2 and a bottom section 3 containing driving means which includes a vibrator 30, an electrical circuit section 31 electrically connected to the vibrator 30, a radiator plate 32 for absorbing the heat generated by the electrical circuit section 31, a transformer 33 for supplying power to the electrical circuit section 31 and a fan means 34 for providing wind to the atomization chamber 2. The atomization chamber 2 includes a ventilation cylinder 20 for guiding the wind from the fan means 34, an atomization cylinder 21 unistructurally formed with the atomization chamber 2 above the vibrator 30 and a nozzle 22 for emitting out the mist generated inside the atomization cylinder 21. The atomization chamber 2 is in communicating relationship with the storage tank 1 through a water supply valve 23. The storage tank 1 is made of an external wall 10 made of a transparent resin material and having a surface exposed to the exterior and a bottom plate 11 made of the same material as the external wall 10. The bottom plate 11 has a conically elevated section approximately at its center and a transparent plate 4 made of the same material as the external tank wall 10 is inserted below the bottom plate 11. Below the transparent plate 4, there is a lamp 6 supported by a support board 5 which is affixed to the transparent plate 4 by screw means. Three light-guiding columns 7a, 7b and 7c of different heights and having tapered top ends are erected above the elevated section of the tank bottom plate 11.

The water supplied from the tank 1 into the atomization chamber 2 through the valve 23 forms an upward column by the supersonic vibrations of the vibrator 30. Mist-like water particles are generated in the vicinity of this water column and these particles are emitted out from the nozzle 22 by the wind from the ventilation cylinder 20. The light from the lamp 6 enters the tank 1 through the transparent plate 4 and the bottom plate 11 and illuminates the surface of the stored water in the tank 1. The user can make use of this to determine the water level. At the same time, a part of the light travels through these light-guiding columns 7a-7c and refracted beams from the individual top end surfaces travel sideways. In the illustrated situation, since the top end surface of the column 7b is inside the water, the light beam refracted at this surface becomes partially absorbed. Since the top end surface of the column 7c is in air, on the other hand, the light beam refracted there travels sideways nearly unattenuated. Accordingly, the luminescent end of the column 7b looks darker than that of column 7c. This indicates to the user that the water surface is somewhere between the top end surfaces of water columns 7b and 7c.

The light-guiding columns are not restricted to be formed as in this example. As shown in FIG. 2, light-guiding columns 7d and 7e with tapered lower end surfaces made of a light-reflective material may be affixed to the ceiling of the tank 1. In this case, the light from the lamp 76 is reflected by the tapered end surfaces of the columns 7d and 7e and the reflected beams travel sideways as shown by the arrows.

The intensity of light going into the tank 1 can be increased by providing the lamp with a reflector. According to the design shown in FIG. 3, there are six light-guiding columns 7f-7k disposed inside the tank 1. Below the lamp 6 is a pan-shaped reflector plate 8 so that the light from the lamp 6 will be transmitted into the tank 1 efficiently. The lamp 6 is disposed near the side wall of the bottom section 3 and a window 9 with a transparent plate is provided on the side wall of the tank so that the light from the lamp 6 escaping sideways can be used as an indicator that the humidifier is in operation.

In all of the embodiments described above, the lamp can be an ultraviolet lamp. According to the embodiment shown in FIG. 4, transparent flat plates 12 and 13 are fitted respectively into the ceiling and at the position of the ventilation cylinder 20 inside the bottom section 3. Above the plate 12, seven light-guiding columns 7l-7r are erected. Below the plates 12 and 13, an ultraviolet lamp 14 is supported from the ceiling of the bottom section 3 by means of support boards 15a and 15b. Since ultraviolet lamps have sterilizing power, this design is effective in preventing bacterial growth both inside the tank 1 and the atomization chamber 2.

FIG. 5 is still a further embodiment of the present invention. A filter 40 made of a material which has both water-absorptive and ventilating characteristics is stretched between a wheel 42 mounted inside the tank 1 and another wheel 43 mounted inside the atomization chamber 3. The wheel 43 is driven by a motor 45 through a belt 43 and a pulley 44. This causes the filter 44 to absorb water in tank 1 and successively move into the atomization chamber 3 where a fan 46 sends air to the filter 40 and causes the water absorbed in the filter 40 to vaporize. The vapor thus generated is ejected outside through louvers 47.

A lamp 6 is disposed at a corner below the tank 1 and a concave reflector 8 is used to propagate the light into the tank 1. A float 49 is slideably disposed areound a supporting column 48 erected from the bottom plate of the tank 1 so as to move vertically along the support column 48 according to the changes in the water level. There is a plane reflector 50 under the tank 1 below the supporting column 48 so that a beam of light from the lamp 6 is reflected by the float 49. This makes the float 49 more easily visible from outside. Also erected from the bottom plate of the tank 1 is a light-guiding column 7s having protrusions so as to make it look like a tree. This column 7s can also make it easier to check the water level.

Light-guiding columns with tapered ends and protrusions have been disclosed above. A light-guiding column, however, may also be a flat plate 60 with a wavy end surface as shown in FIG. 6. When light is sent from below, it is reflected and refracted sideways as shown and a continuous variation in brightness is obtained.

In summary, a transparent plate is used at the bottom of the water storage tank and a light-emitting means is disposed below this transparent plate according to the present invention so that the surface of water in the tank is illuminated and becomes easily visible by the user. Structures having surfaces for emitting reflected or refracted light are also disposed inside the tank so that the water level can be determined from the difference in brightness of such surfaces, depending on whether they are in water or in in air.

Although the present invention has been described above in terms of only a limited number of examples, they are intended to be illustrative rather than limiting. For example, the external wall 10 and the bottom plate 11 of the tank 1 need not be transparent all over. It is sufficient if only the sections where light should pass are made transparent. It also goes without saying that the present invention can be applied not only to humidifiers but also as a level-indicating means for any system which contains water or any other light-transmissive liquid. The scope of the invention is defined only by the following claims.

What is claimed is:

1. A humidifier comprising a water tank and an atomization chamber mounted on a bottom section having driving means therein, said water tank having an external wall and a bottom wall means made of a transparent material and having a surface substantially exposed to the exterior, a light source mounted on support means beneath said bottom wall means for emitting light into said water tank, and a means on said bottom wall means for guiding and leading said light onto said external wall, the water level in said tank being detectable visually through said external wall by said light.

2. A humidifier comprising a water tank and an atomization chamber mounted on a bottom section having driving means therein, said water tank having an external wall made of a transparent material and a surface substantially exposed to the exterior, a bottom wall which is made partially or totally of a transparent plate, a light source mounted on support means beneath said bottom wall and disposed below said transparent plate, and a structure disposed in said tank, said structure having a surface adapted to reflect or refract light from said light source to said external wall, the water level in said tank being detectable visually through said external wall by said light.

3. The humidifier of claim 2 wherein said support means is connected to said bottom wall.

4. The humidifier of claim 1 wherein said light source is an ultraviolet lamp.

5. The humidifier of claim 1 wherein said support means is connected to said bottom wall means.

6. A liquid level indicator for displaying the level of a light-transmissive liquid contained in a tank which has an external wall and a bottom wall means made of a transparent material, said tank having a surface substantially exposed to the exterior, said liquid level indicator comprising a light source mounted on support means beneath said bottom wall means and a means for guiding and leading light from said light source to said external wall, the water level in said tank being detectable visually through said external wall by said light.

* * * * *